Aug. 24, 1926.
J. B. DAVILA
1,597,434
ANIMAL TRAP
Filed Jan. 2, 1925
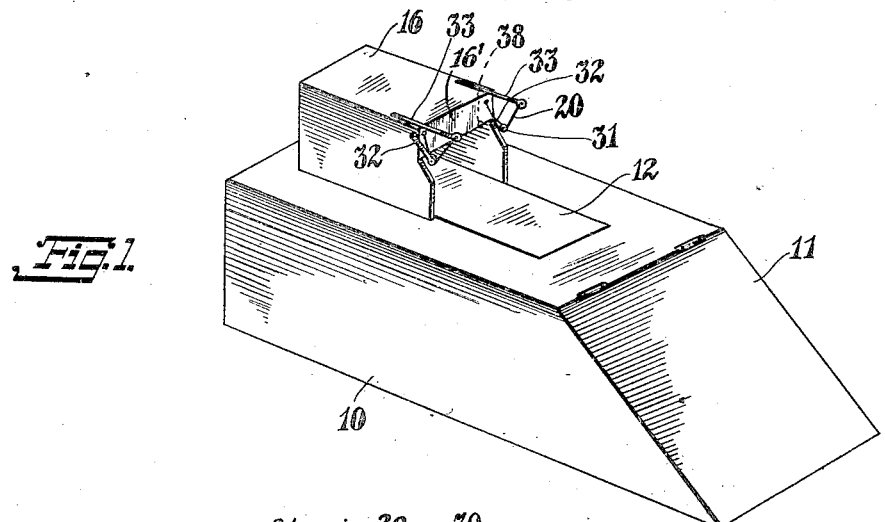
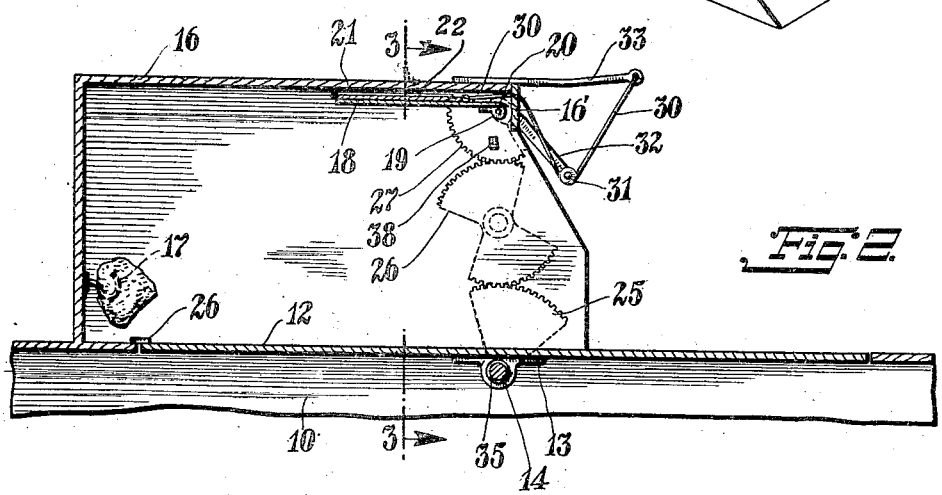
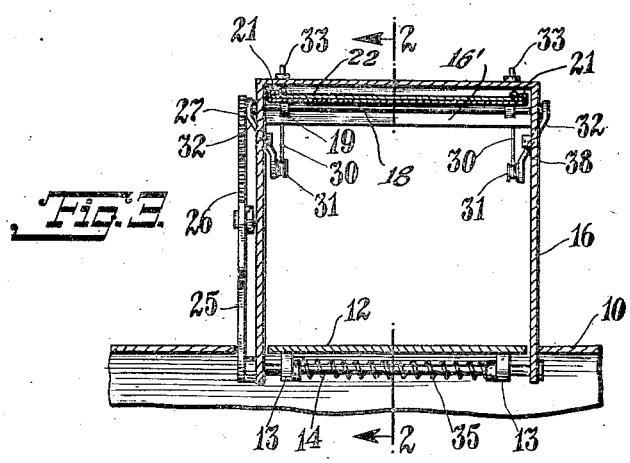
INVENTOR
Juan B. Davila
BY
ATTORNEY Patented Aug. 24, 1926.

1,597,434

UNITED STATES PATENT OFFICE.

JUAN B. DAVILA, OF NEW YORK, N. Y.

ANIMAL TRAP.

Application filed January 2, 1925. Serial No. 13.

This invention relates to animal traps of the type comprising a suitable enclosure formed with a trap door through which the animal is projected when attempting to reach the bait mounted on the box or enclosure.

The invention has for an object to provide a novel trap of this sort having its bait holder in a housing provided with an automatically operating door that swings down to closed position as soon as the trap door starts to descend.

For further comprehension of the invention, and of the objects and advantages thereof, reference will be had to the following description and accompanying drawing, and to the appended claims in which the various novel features of the invention are more particularly set forth.

Fig. 1 of the drawing is a perspective view of my improved animal trap.

Fig. 2 is a longitudinal vertical sectional view thereof, this view being taken on the line 2—2 of Fig. 3.

Fig. 3 is a transverse sectional view taken on the line 3—3 of Fig. 2.

Referring now to the drawing my improved trap comprises a box 10 arranged to present at one end a sloping runway 11 that leads up to the top of the box. The top of the box is formed with an aperture in which is positioned a trap door 12, this trap door being here shown as fixed, as by the brackets 13, to a transverse shaft 14 that is located near the top of the box and suitably journaled in the side walls thereof.

Extending partly around the door 12 is an enclosure or housing 16 that rests upon the top of the box and is open at one end for the entrance of the animal. Upon the inner closed end of this housing a bait hook 17 is mounted, the front or open end of the housing being adjacent the hinge axis of the trap door 12.

At the front end of the housing 16, I provide a compound closure door which is moved to closed position when the trap door 12 tilts downward to project the animal into the box 10. This door comprises a pair of sections or panels of which one 18 is fixed at one edge as by the brackets 19 to a transverse shaft 20 supported by the housing 16 near the top thereof. This section 18 is provided at its sides with backturned guide members 21 that slidably engage the other section 22 to support the latter slidably upon the first named section 18. To operatively connect the trap door 12 to the sectional door 18, 22, a gear segment 25 is fixed to one end of the shaft 14 on which the door 12 is mounted, and meshes with an idler segment 26 mounted on the side of the housing 16, this idler meshing in turn with a segment 27 on the end of the shaft 20, the segment 27 being smaller than the segment 25, so as to cause a relatively large swinging movement to be imparted to the housing door.

The door section 22 has attached thereto at the top edge thereof, by top edge being meant the edge nearer the hinge axis of the sectional door, a pair of cords 30 that pass outwardly through openings in a crosspiece 16' on the front end of the housing 16 and under grooved rollers 31 carried by the free ends of the arms 32 fixed to opposite ends of the shaft 20, these cords passing upward from the rollers 31 to be attached to arms 33 projected rearwardly from the top of the housing 16. The trap door 12 is urged upward to closed position by a suitable cord or resilient element 35 wound around the shaft 14 and connected at opposite ends respectively to said shaft and the door, upward movement of the door being limited by a stop element 36 on the top of the box 10.

It is believed that the manner of operation of my improved trap will be apparent from the above description. Normally the parts assume the position shown most clearly in Fig. 2 of the drawing, with the housing door lying adjacent the top of the housing and the section 22 completely overlying the section 18 of said door, the cords 30 being bent by passing under the rollers 31. When an animal steps on the trap door 12 and overbalances the latter the housing door is swung downward, and during this movement the arms 32, by swinging upward, allow the cords 30 to straighten and permit the door section 22 to slide downward. Closing movement of the housing door may be limited by stop members such as 38 on the housing 16. When the animal falls from the trap door 12 into the box 10 the members 35 returns the trap door to normal position, the housing door being also reposition, the housing door being also returned to the position shown. It will be understood of course that the housing door is of comparatively light construction.

Having thus described my invention, what

I claim as new and desire to protect by Letters Patent of the United States is as follows:—

1. In a trap comprising a box, a trap door in the top of said box, and a housing partially surrounding said trap door, the combination in the operative means embodying a driver segment coaxially rigidly attached to said trap door engaging an idler segment operating a driven segment rigidly fastened to a shaft having rigidly attached arms with rollers thereon bearing against cords having one end fastened to a fixed element on said housing, and the other end attached to the slidable section of a hingedly mounted door for said housing.

2. In a trap comprising a box, a trap door in the top of said box, and a housing partially surrounding said trap door, the combination in the operative means embodying a coaxial normal position spring for said trap door, a driver segment coaxially rigidly attached to said trap door, engaging an idler segment operating a driven segment rigidly fastened to a shaft having rigidly attached arms with rollers thereon bearing against cords having one end fastened to a fixed element on said housing, and the other end attached to the slidable section of a hingedly mounted door for said housing.

3. In a trap comprising a box, a trap door in the top of said box, and a housing partially surrounding said trap door, the combination in the operative means embodying a driver segment coaxially rigidly attached to said trap door, engaging an idler segment operating a driven segment rigidly fastened to a shaft having rigidly attached arms with rollers thereon bearing against cords having one end fastened to a fixed element on said housing, and the other end attached to the slidable section of a hingedly mounted door for said housing and the closing movement of said hingedly mounted door being limited by stop members on the said housing.

4. A trap comprising a box, a trap door in the top of said box, a housing partially surrounding said trap door, a hinged closure door hinged at its upper edge to said housing at the entrance to the latter, said closure door being made of two panel sections one of which is slidable upon the other, a driver segment coaxially rigidly attached to said trap door, engaging an idler segment operating a driven segment rigidly fastened to a shaft having rigidly attached arms with rollers thereon bearing against cords having one end fastened to a fixed element on said housing, and the other end attached to the slidable section of said closure door.

In testimony whereof I have affixed my signature.

JUAN B. DAVILA.